United States Patent [19]

Church et al.

[11] Patent Number: 4,692,245
[45] Date of Patent: Sep. 8, 1987

[54] FILTER ASSEMBLY WITH HIGH PRESSURE CONNECTION TO COLLECTION BOWL

[75] Inventors: John F. Church; Walter H. Stone, both of Modesto, Calif.

[73] Assignee: Parker Hannifin Corporation, Cleveland, Ohio

[21] Appl. No.: 784,292

[22] Filed: Oct. 7, 1985

Related U.S. Application Data

[63] Continuation-in-part of Ser. No. 733,808, May 14, 1985.

[51] Int. Cl.$^4$ .............................................. B01D 27/08
[52] U.S. Cl. .................................... 210/232; 210/248; 210/444
[58] Field of Search ...................... 210/167, 416.4, 443, 210/444, 446, 447, 450, 453, 457, DIG. 5, DIG. 17, 248, 416.5, 232, 303, 307, 308, 311, 312, 313, 315

[56] References Cited

U.S. PATENT DOCUMENTS

| | | | |
|---|---|---|---|
| 2,418,777 | 4/1947 | Le Clair | 210/450 |
| 2,524,336 | 10/1950 | Vokes | 210/131 |
| 3,122,501 | 2/1964 | Hultgren | 210/444 |
| 3,225,929 | 12/1965 | Sicard | 210/444 |
| 3,312,351 | 4/1967 | Kasten | 210/DIG. 5 |
| 4,292,179 | 9/1981 | Stone et al. | 210/443 |
| 4,372,847 | 2/1983 | Lewis | 210/DIG. 5 |
| 4,502,955 | 3/1985 | Schaupp | 210/DIG. 5 |
| 4,502,956 | 3/1985 | Wilson et al. | 210/248 |
| 4,565,629 | 1/1986 | Wilson et al. | 210/248 |

Primary Examiner—Richard V. Fisher
Assistant Examiner—Wanda L. Millard
Attorney, Agent, or Firm—Joseph B. Balazs

[57] ABSTRACT

A filter assembly and associated collection bowl for a dual contaminant collection zone arrangement use a self-sealing o-ring in combination with a threaded mating arrangement in order to withstand high pressure differentials. The filter assembly includes an end cap having a plurality of downwardly projecting ribs distinct from a threaded connector ring upon which the end cap rests. The end cap includes a number of contaminant channels between adjacent pairs of the ribs, the contaminant channels leading to corresponding contaminant outlets.

4 Claims, 10 Drawing Figures

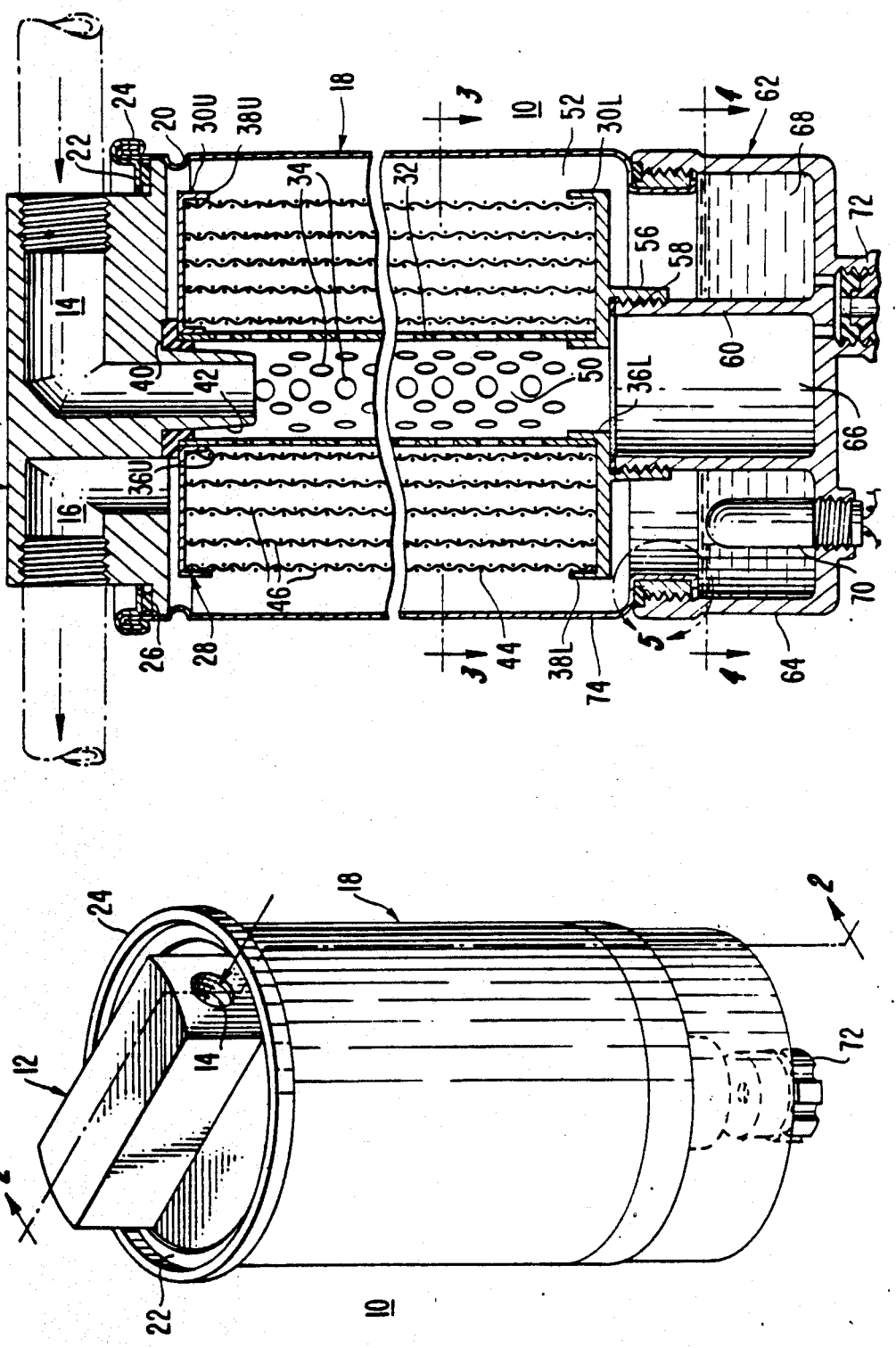

FILTER ASSEMBLY WITH HIGH PRESSURE CONNECTION TO COLLECTION BOWL

CROSS-REFERENCE TO RELATED APPLICATION

This application is a continuation-in-part of Ser. No. 733,808 filed May 14, 1985 by Walter H. Stone, assigned to the assignee of the present application, and entitled "Semipermeable Baffle Fuel Filter".

BACKGROUND OF THE INVENTION

This invention relates to fuel filters and contaminant collection bowls for attachment to fuel filters.

As used herein, "filter" refers to devices used to separate out particulate matter from liquids and also to devices, commonly called "separators", used to separate liquid contaminants out from a desired liquid or liquids. As used herein, "fuel" refers to gasoline, oil, or other liquid fuels.

Numerous filter designs use contaminant collection bowls disposed below filter units.

For example, U.S. Pat. No. 4,502,956, Wilson et al., assigned to the assignee of the present invention, discloses a contaminant collection bowl in FIG. 4 which may threadably attach underneath a filter unit and receive contaminants from the fuel flowing through the filter unit.

The following other U.S. patents show various filter assemblies:

| U.S. Pat. No. | Inventor | Issue Date |
| --- | --- | --- |
| 2,524,336 | Vokes | Oct. 3, 1950 |
| 3,312,351 | Kasten | Apr. 4, 1967 |
| 4,292,179 | Stone et al. | Sep. 29, 1981 |

The Vokes patent discloses a filter having a collection bowl which threadably attaches at the center of a filter unit and includes seals extending around the peripheral edges of the collection bowl.

The Kasten patent discloses a fuel filter having a contaminant collection bowl including a shoulder, seal, and threads on the upper outside of the collection bowl.

The Stone et al. patent discloses a filter unit having a flow reversing baffle arrangement disposed at an upper part of the filter unit.

Published U.K. application No. 2078536A shows a fuel filter with a collection bowl having attachment threads on its outer wall.

Although the above and numerous other designs have been generally useful in providing filtering, they have been subject to several disadvantages.

Numerous designs having contaminant collection bowls which threadably attach to the bottom of filter units have been quite limited in the amount of pressure they can withstand. For example, the interface between the peripheral wall of the collection bowl and the filter unit may be limited to withstanding a pressure differential of 30 pounds per square inch between the interior pressure and the ambient air. Accordingly, such filter units may only be used in relatively low pressure applications.

A further disadvantage of numerous filter designs is that increased pressure differential between the interior of the filter and the outside may tend to separate the connection between the collection bowl and the filter unit. Regardless of the actual pressure limit for a particular filter construction, it is undesirable to have an increased pressure differential causing a decrease in the sealing force or isolation between the ambient air and the filter interior.

A further disadvantage of numerous filter designs is that they are complex and/or costly in construction.

OBJECTS AND SUMMARY OF THE INVENTION

Accordingly, it is a primary object of the present invention to provide a new and improved filter.

Another object of the present invention is to provide a new and improved collection bowl for mounting on a filter.

A more specific object of the present invention is to provide an arrangement for connecting a filter unit to a collection bowl which is relatively simple and inexpensive in construction.

A further object of the present invention is to provide an arrangement for connecting a filter unit and collection bowl together such that an increased pressure differential will increase the sealing force at the interface of the collection bowl and filter unit.

A still further object of the present invention is to provide a filter unit and collection bowl which may withstand great pressure differentials between the filter interior and the ambient air.

The above and other objects of the present invention which will become more apparent as the description proceeds are realized by a fuel filter unit including: a casing having a cylindrical peripheral wall and first and second fuel ports to define a fuel flow path through the filter unit, a first filter medium extending in a loop within the casing and separating a central fuel chamber from a peripheral fuel chamber, the peripheral fuel chamber disposed directly between the first filter medium and the casing, the first filter medium disposed intermediate the first and second fuel ports in the fuel flow path, a peripheral contaminant outlet operable to allow contaminants to directly (i.e., no intervening filter medium) exit from the peripheral fuel chamber by way of at least one contaminant channel, an end cap disposed below the first filter medium, the contaminant channel inwardly extending in the end cap, and an annular threaded portion distinct from the cylindrical peripheral wall and disposed in line below the end cap (i.e., a vertical line from the end cap can intersect the threaded portion) and at the cylindrical peripheral wall and operable to threadingly engage mating threads on a cylindrical peripheral wall of a collection bowl such that engagement between the threaded portion and the mating threads separates the peripheral fuel chamber from ambient air. The filter unit includes a plurality of peripheral contaminant outlets allowing contaminants to directly exit from the peripheral fuel chamber by way of a corresponding plurality of contaminant channels extending inwardly in the end cap. The end cap includes a plurality of downwardly projecting ribs and the contaminant channels extend between adjacent ones of the ribs. The end cap includes a lower annular first ridge and the ribs extend radially out from the first ridge to define a plurality of lower surface portions having peripheral edges and disposed between each pair of adjacent ribs and the ribs extend out beyond the lower surface portions to provide offset between the peripheral edges and an inner surface of the peripheral wall. The annular threaded portion is distinct from the end cap and has the ribs at least partially resting thereon. All of the lower surface portions are co-planar and unbounded at their peripheral edges. The end cap has a lower annular second ridge, concentric and within the first ridge, and an annular isolation seal disposed between the first and second ridges and operable to mate with a cylindrical interior wall of a collection bowl. The invention further comprises a contaminant collection bowl removably attached to the filter unit, the collection bowl including: at least a first contaminant collection zone, a cylindrical outer wall extending around the first contaminant collection zone, an annular rim extending around the outside of the outer wall, the annular rim having an upper surface extending outwardly at an acute angle with respect to the outer wall, threads extending around an outer upper portion of the outer wall and engaged to the threaded portion, and an annular seal seated in the acute angle between the rim and the wall and operable such that an increased pressure differential between the first contaminant collection zone and ambient air will increase the sealing force of the annular seal. The seal is completely within the cylindrical wall.

The invention may further be described as a fuel filter including: a casing having a cylindrical peripheral wall and first and second fuel ports to define a fuel flow path through the filter unit, a first filter medium extending in a loop within the casing and separating a central fuel chamber from a peripheral fuel chamber, the peripheral fuel chamber disposed directly between the first filter medium and the casing, the first filter medium disposed intermediate the first and second fuel ports in the fuel flow path, a plurality of peripheral contaminant outlets operable to allow contaminants to directly exit from the fuel chamber by way of a corresponding plurality of contaminant channels, an end cap disposed below the first filter medium, the end cap including a plurality of downwardly projecting ribs, the contaminant channels each inwardly extending in the end cap between adjacent ones of the ribs, and an annular threaded portion distinct from and disposed below the end cap and having the ribs at least partially resting thereon and operable to engage mating threads of a contaminant collection bowl. The threaded portion is disposed at the cylindrical peripheral wall and operable to threadingly engage mating threads on a cylindrical peripheral wall of a collection bowl such that engagement between the threaded portion and the mating threads separates the peripheral fuel chamber from ambient air.

The invention alternately is described as including a contaminant collection bowl having: at least a first contaminant collection bowl, à cylindrical outer wall extending around the first contaminant collection zone, an annular rim extending around the outside of the outer wall, the annular rim having an upper surface extending at an acute angle with respect to the outer wall, threads extending around an outer upper portion of the outer wall, and an annular seal seated in the acute angle between the rim and the outer wall and operable such that increased pressure differential between the first contaminant collection zone and ambient air will increase sealing force of the annular seal. The collection bowl further includes a second contaminant collection zone separated from the first contaminant collection zone by a cylindrical interior wall, the interior wall contacting an isolation seal disposed on the end cap of a filter unit. The casing of the filter unit has a portion inwardly and upwardly extending at an acute angle to the outer wall of the collection bowl and the annular seal is completely between the inwardly and upwardly extending portion and the rim.

BRIEF DESCRIPTION OF THE DRAWINGS

The above and other features of the present invention will be more readily understood when the description is considered in conjunction with the accompanying drawings wherein like characters represent like parts throughout the several views and in which:

FIG. 1 shows a perspective view of an embodiment of the present invention.

FIG. 2 shows a cross-section view taken along lines 2—2 of FIG. 1.

DETAILED DESCRIPTION

Figure 3:
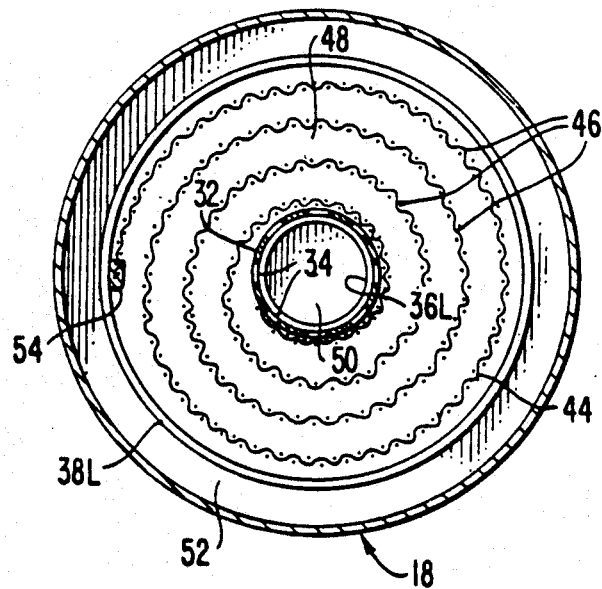
FIG. 3 shows a cross-section view taken along lines 3—3 of FIG. 2.
Figure 4:
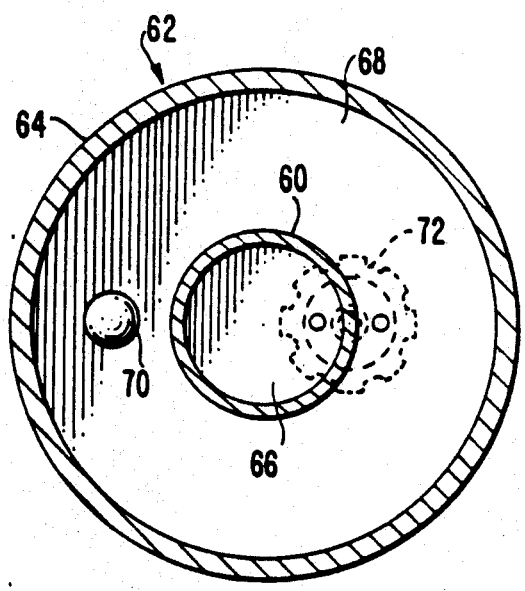
FIG. 4 shows a cross-section view taken along lines 4—4 of FIG. 2.

With reference now to the perspective view of FIG. 1 and the cross-section view of FIG. 2, a filter assembly 10 of the present invention will be described. The filter assembly 10 includes a head assembly 12 including a fuel inlet 14 and a fuel outlet 16, each of which is threaded as shown to facilitate hose connections. The head assembly 12, which is preferably die cast or molded synthetic plastic is attached at the top of a filter housing 18. In particular, the head assembly 12 is trapped between an inwardly extending annular bead or ridge 20 and a radially inwardly extending flange 22. As apparent from the drawing, the housing 18 includes an upper ridge 24 caused by doubling over of the layer of material (preferably metal) used for the housing 18. From the annular bead 20, the layer extends up to a U-shaped turn and extends radially outward and immediately downward and is locked in a lock seam which extends upward and over the doubled over portion to the inwardly extending flanges 22. Disposed between the flange 22 and the head assembly 12 is an annular sealing gasket 26.

With reference to FIG. 2 and the cross-section view of FIG. 3 taken along lines 3—3 of FIG. 2, the cartridge-type fuel filter 28 disposed within the filter housing 18 will be described. The filter 28 includes an upper end cap 30U and a lower end cap 30L, each of which is made of liquid impermeable material such as metal or plastic. Extending between the end caps 30U and 30L is a hollow connecting cylinder 32 including a large number of circular holes 34 extending 360° around the cylinder and substantially along its length. As shown, the cylinder 32 is adhered or otherwise attached to an inner upwardly projecting circular ridge 36L on the lower end cap 30L. Additionally, the cylinder 32 is adhered or otherwise attached to an inner downwardly extending circular ridge 36U on the upper end cap 30U. As shown, each of the end caps 30U and 30L includes outer circular ridges 38U and 38L. Mounted on the top end cap 30U is a circular gasket 40 which prevents fuel from bypassing the filter 28. Additionally, the gasket 40, made of rubber or other elastomeric material, may optionally be used to lock the filter 28 onto a downwardly extending tube 42 from the head assembly 12. Although not shown in the drawing, the tube 42 may optionally include a recessed diameter portion adjacent its top such that the resilience of the gasket 40 will tend to hold the filter 28 in the proper position relative to tube 42.

Extending from outside of the cylinder 32 and the inner circular ridges 36U and 36L is a baffle 44 comprising a plurality of flights 46, each flight being a layer of semipermeable filter media. As best shown in FIG. 3, the filter media of the baffle 44 extend out in a spiral to define the filter media flights 46 and to define a circuitous open channel 48 extending out from a first, interior, centrally located fuel zone 50 to a second, annular, exterior fuel zone 52 disposed between the filter housing 18 and the outermost part of the baffle 44. As shown, the distance between adjacent layers or flights 46 is greater than the thickness of any of the layers or flights. Although the baffle 44 may be secured at its interior to a part of the cylinder 32, it is important that at least some of the holes 34 communicate freely with the channel 48 such that fuel may flow from the interior zone 50 by way of the circuitous spiral channel 48 to the exterior fuel zone 52 without passage through the semipermeable layers or flights 46. Instead of being attached to a portion of cylinder 32, the inner most part of the baffle 44 could alternately be radially offset from the cylinder 32. In either case, the cylinder 32 is used to provide structural ridgity to the combination of the baffle 44 and the end caps 30U and 30L. Depending upon the filter medium used for baffle 44, the layers or flights 46 might provide sufficient structural support without the necessity of including a metallic or plastic connecting cylinder 32.

The filter media used for the layers or flights 46 of baffle 44 may be a metal screen, fabric, synthetic coated metal screen, metal coated synthetic screen, synthetic screen, synthetic fabric (polyester, nylon, polypropylene, Teflon, polyethylene, or other man-made fiber) or non-woven synthetics or natural fibers including air layed or liquid layed materials such as paper or Reemay type materials. Manufacturing convenience would favor the screens, but the non-woven synthetics have better performance in some tests. In the preferred embodiment, the filter media is best suited for separating water from diesel fuel. Lighter fuels such as gasoline and heavier fuels such as oil would require appropriately chosen, possibly different, filter media.

A metallic clip 54 is used as reinforcement at the outermost edge of the baffle 44 and may be secured to the outer circular ridges 38U and 38L.

With reference especially to FIG. 2, it will be noted that the channel 48 is sealed at its upper end by upper end cap 30U and is sealed at its lower end by lower end cap 30L. Accordingly, fuel traveling in either direction between the first and second fuel zones 50 and 52, cannot bypass the baffle 44. The fuel may proceed along the circuitous channel 48 or/and radially through the semipermeable barrier layers or flights 46 of baffle 44.

As shown in FIG. 2, the lower end cap 30L includes a mating portion 56 having the illustrated threads for mating with threads 58 on an inner circular wall 60 of a contaminant collection bowl 62 also having an outer wall 64, thereby defining a central interior contaminant collection zone 66 and an annular exterior contaminant collection zone 68 which may include a water level sensor 70. Both of the contaminant collection zones 66 and 68 may be drained by the drain 72. Although the particulars of the level sensor 70 and drain 72 are not a necessary part of the present invention, various details with respect thereto may be gathered from U.S. Pat. No. 4,502,956 issued on Mar. 5, 1985 to Wilson et al. including the present inventor and hereby incorporated by reference. If desired, the collection bowl 62 may include a fuel heating arrangement such as disclosed and claimed in U.S. Pat. No. 4,502,955 issued on Mar. 5, 1985 to Schaupp and hereby incorporated by reference.

Figure 5:
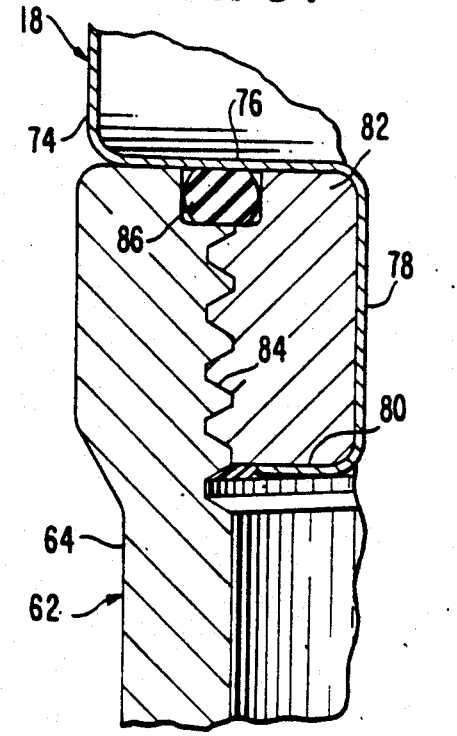
FIG. 5 shows a closeup view of the parts within circle 5 of FIG. 2.

As shown in the detailed view of FIG. 5, the lower portion of side wall 74 of the housing 18 curves inwardly at portion 76, downwardly at portion 78 and outwardly at portion 80 with an annular threaded ring 82 which is trapped between portions 76 and 80. The annular threaded ring 82, which is preferably molded plastic, is threaded to the threads 84 extending around the top of the outer wall 64 of collection bowl 62 and the threaded connection is sealed by an o-ring 86.

With reference now to the cross-section view of FIG. 6, another embodiment of the present invention will be discussed. Those parts of the FIG. 6 embodiment which correspond generally to parts in the embodiment of FIGS. 1-5 will be labeled with the same last two digits in the 100 series, whereas parts of the FIG. 6 embodiment which do not have a similar part in the embodiment of FIGS. 1-5 will be numbered in the 200 series. Emphasis will be placed upon the differences between the embodiment of FIG. 6 and that of FIGS. 1-5.

Figure 6:
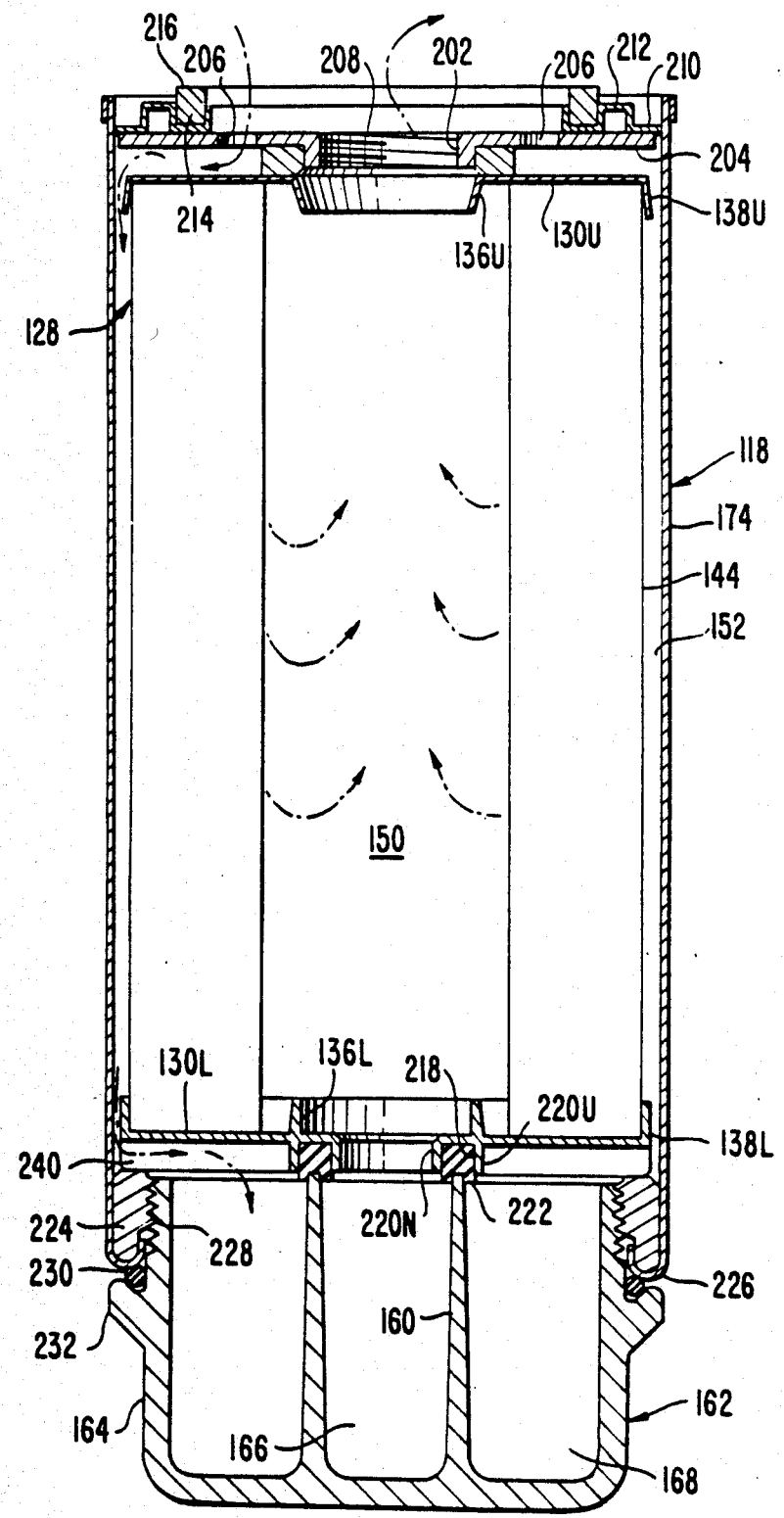
FIG. 6 shows another version of the present invention.

Unlike the arrangement of the first embodiment, the second embodiment shown in FIG. 6 uses a "spin-on" type of filter housing 118 in which baffle 144 is disposed and secured between upper and lower end caps 130U and 130L fixed in position in housing 118. For ease of illustration, filter 144 is shown in block form only. It will of course be readily understood that the filter 144 may comprise a series of spiral extending flights of layers of filter media extending out from a second fuel zone 150 to a first fuel zone 152 in essentially the same manner as the flights 46 of FIG. 3. Alternately, the filter medium could be a closed loop such as used in the incorporated by reference Wilson et al. patent. The filter unit 128 of FIG. 6 includes filter 144, filter casing or housing 118, and the associated parts.

Instead of having a head assembly such as 12 (FIG. 2) permanently mounted to the housing as with the arrangement shown in FIG. 2, the FIG. 6 embodiment includes a central threaded portion 202 to which a separate head assembly (not shown) may be threadably attached. The head assembly may be generally similar to that shown in FIG. 4 of the above-mentioned Wilson U.S. Pat. No. 4,502,956. The threads 202 are within a top piece including a number of fuel entry ports 206 spaced circumferentially around the threads 202, the interior of which constitutes a central fuel exit port 208. As shown, the cover 210 could be a separate piece welded or otherwise attached within the cylindrically side wall 174. The cover 210 includes an annular ridge 212 and an annular groove 214 in which an annular seal 216 may be mounted. When the head assembly (not shown) is threaded into the threads 202, a seal on the head assembly may separate the central fuel exit port 208 from the plurality of circumferentially arranged fuel entry ports 206. Of course, the fuel could alternately enter through the port 208 within threads 202 and exit by way of the holes 206 in order to realize a radially outward fuel flow instead of the radially inward pattern shown in FIG. 6.

The filter 144 extends vertically between the end caps 130U and 130L and extends radially within the annular space between upper inner ridge 136U and upper outer ridge 138U and the annular space between lower inner ridge 136L and lower outer ridge 138L.

The bottom of the lower end cap 130L includes an annular groove 218 in between inner and outer circular or annular ridges 220N and 220U respectively. As shown in FIG. 6, the groove 218 together with a seal 222 disposed therein constitutes a mating portion for mating with an inner wall 160 of the contaminant collection bowl 162 which also includes an outer or peripheral wall 164 such that a central or interior contaminant collection zone 166 is bounded by the cylindrically wall 160, which wall also serves as a boundary for an annular exterior contaminant collection zone 168. Although not shown in the drawing, a level sensor such as sensor 70 of FIG. 2 and a drain such as drain 72 of FIG. 2 would also be included in the contaminant collection bowl 162.

Separate from the end cap 130L is a attachment ring 224 which extends in annular fashion about the lower end of side wall 174 and held securely in place by the inwardly and upwardly turned end 226 of the side wall 174. As shown, the attachment ring 224 includes threads on a threaded portion which mate to the threads 228 mounted at the top of the outer wall 164. As the collection bowl 162 is threaded to the attachment ring 224, an o-ring 230 extending around and within the annular outward projecting rim ridge 232 is compressed to seal the collection bowl from the external atmosphere. Simultaneously, the inner wall 160 compresses the seal 222 to seal off the inner contaminant collection chamber 166 from the outer contaminant collection chamber or zone 168.

An important feature of the present invention is best considered in conjunction with FIG. 6. The upper surface of rim 232 extends as shown at an acute angle with respect to the peripheral wall 164. Increased pressure differential between the peripheral fuel zone 152 (by way of contaminant zone 168) and the ambient air tends to push radially outwardly on the peripheral wall 164 and the o-ring 230. This compresses the o-ring 230 into a smaller volume and increases its sealing force or ability to isolate zones 152 and 168 from the ambient air. The arrangement is self-sealing in that pressure within zone 152 (and thus 168) will insure proper sealing of seal 230. The increased compression of the o-ring 230 under higher pressures is a result of the incline or slant (in cross-section) from the horizontal of the upper surface of rim 232 and the inwardly and upwardly extending portion at end 226. As shown, this inwardly and upwardly extending portion is at an acute angle (i.e., its tangent in cross-section view) to outer wall 164.

As shown, the ring 224 is distinct (i.e., not integral) with the end cap 130L, this easing manufacture of each of these preferably plastic molded nylon parts. Likewise, ring 224 is distinct from the wall 174 such that any outward bulge of wall 174 caused by high interior pressure is not likely to disengage the threads of ring 224 from threads 228.

Figure 8:
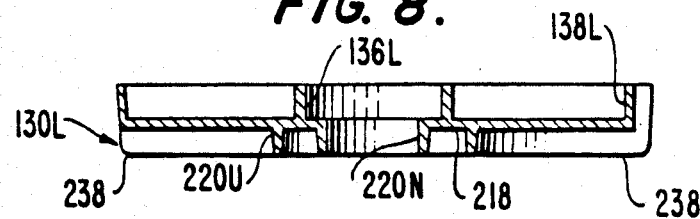
FIG. 8 shows a cross-section view along lines 8—8 of FIG. 7.
Figure 9:
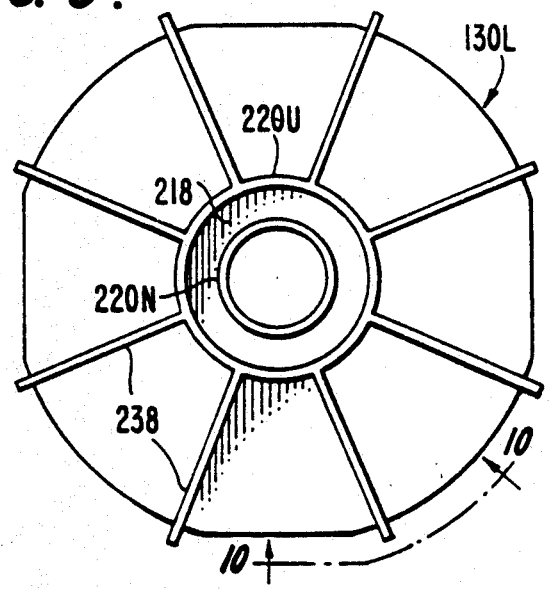
FIG. 9 shows a bottom view of an end cap.
Figure 10:
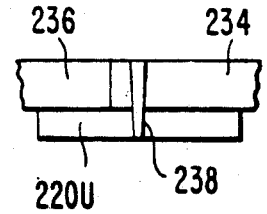
FIG. 10 shows a view along lines 10—10 of FIG. 9.

With reference now to the top view of FIG. 7, cross-section view of FIG. 8, bottom view of FIG. 9, and side detail view of FIG. 10, the end cap 130L will be discussed in detail.

Figure 7:
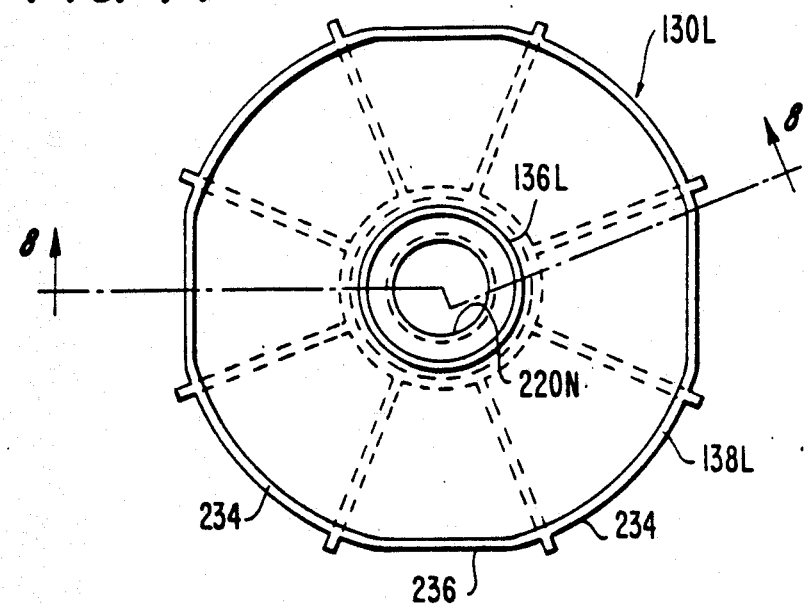
FIG. 7 shows a lower end cap as may be used with the present invention.

As best seen in FIG. 7, the outer ridge 138L deviates from a perfect cylinder. Specifically, it alternates between circularly curved segments 234 and straight edge segments 236. The bottom of the lower end cap 130L includes a plurality of radial ridges 238 extending outwardly from the outer lower annular ridge 220U and extending beyond the edge of the segments 234, as best shown in the right side of FIG. 8 and in FIG. 9. As shown in FIGS. 8 and 9, the lower surface portions between ribs 238 are co-planar and unbounded (i.e., no ridge) at their peripheral edges.

The end cap 130L is an improvement upon the end cap 76 of commonly assigned U.S. patent application Ser. No. 626,031 filed June 29, 1984 by Walter H. Stone and hereby incorporated by reference. However, the end cap 130L is like end cap 76 of that application in that it allows prefiltering drainage of contaminants for both radially inward fuel flow and radially outward fuel flow.

The radial ridges 238 center the lower end cap 130L within the filter housing 118 while allowing contaminants to flow in the contaminant channels between the alternating segments 234, 236 and the inside surface of side wall 174. The contaminant channels extend inwardly on the end cap 130L between adjacent pairs of the ribs 238 on the underside of end cap 130L. Thus, with reference to FIG. 6, contaminants can flow in the path noted by arrow 240 in order to drop into the outer contaminant collection zone 168. Additionally, water or other contaminants which have been slowed sufficiently by the baffle filter 144 will drop out of the fuel zone 150 through the contaminant outlet within the ridges 136L and 220N and fall into the center or interior contaminant collection zone 166.

The construction of the embodiment of FIG. 6 is relatively simple. In particular, the casing 118 is initially bent inward at its bottom (see FIG. 6) by any of various known mechanical bending processes. The threaded ring connector 224 is then placed into the top of the metallic casing or can 118 whereupon it slides or is pushed down into engagement with the inwardly bent portions at end 226. The filter 144 which has previously been glued or otherwise adhered to upper and lower end caps 130U and 130L is then dropped into the can 118 such that the ribs 238 at least partially rest upon the connector ring 224. The gasket and other parts shown above upper end cap 130U may then be placed within the can or housing 118, after which the upper end of the housing 118 may be mechanically bent to form its double edge and to form portions 210 and 212 therefrom. Portions 210 and 212 could alternately be part of a separate cover inserted in housing 118 and welded, glued or otherwise fixed therein. Alternately, the top portion of the filter unit 118 could be constructed with the arrangement of FIG. 2 and using a lock seam technique as with part 22 of FIGS. 1 and 2.

As the principals of filtering operation of the FIGS. 6-10 embodiment are essentially similar to that of the embodiment shown in FIGS. 1-5, the operation will be discussed with reference to FIGS. 2 and 3 in particular. It should also be noted that either of the embodiments may be used for radially inward or radially outward flow.

Fuel enters to within the connecting cylinder 32 by way of the tube 42. Heavy contaminants may drop out of the fuel by passage through the contaminant outlet within the circular ridge 36L. The fuel and remainder of the contaminants pass through the holes 34, thus leaving the interior fuel zone 50 and traveling towards the exterior fuel zone 52. As the fuel passes radially outward, the barrier action of the filter media spiral flight 46 preferentially slows the contaminants, while allowing the fuel to maintain a relatively higher speed. As the contaminants drop out of the fuel proceeding radially outward, they fall to the bottom of the spiral channel 48 where they settle and take the long circuitous route to the outside of the baffle 44. Once outside the baffle 44, the contaminants have slowed significantly relative to the fuel and the contaminants drop from the zone 52 through the contaminant outlet between the end cap 30L and the inner surface of side wall 74. As the contaminants drop into the exterior annular contaminant collection zone 68, the fuel has generally kept up its higher speed and may freely pass out of the fuel outlet 16 disposed above the baffle filter 44.

Although various specific constructions and details have been described herein, it is to be understood that these are for illustrative purposes only. Various modifications and adaptations will be readily apparent to those of skill in the art. Accordingly, the scope of the present invention should be determined by reference to the claims appended hereto.

What is claimed is:

1. An invention comprising a fuel filter unit including:
   (a) a casing having a cylindrical peripheral wall and first and second fuel ports to define a fuel flow path through said filter unit;
   (b) a first filter medium extending in a loop within said casing and separating a central fuel chamber from a peripheral fuel chamber, said peripheral fuel chamber disposed directly between said first filter medium and said casing, said first filter medium disposed intermediate said first and second fuel ports in said fuel flow path;
   (c) a peripheral contaminant outlet operable to allow contaminants to directly exit from said peripheral fuel chamber by way of at least one contaminant channel;
   (d) an end cap disposed below said first filter medium, said contaminant channel inwardly extending in said end cap; and
   (e) an annular threaded portion distinct from said cylindrical peripheral wall and disposed in line below said end cap and at said cylindrical peripheral wall and operable to threadingly engage mating threads on a cylindrical peripheral wall of a collection bowl such that the engagement between said threaded portion and the mating threads separates said peripheral fuel chamber from ambient air,
   said filter unit including a plurality of peripheral contaminant outlets allowing contaminants to directly exit from said peripheral fuel chamber by way of a corresponding plurality of contaminant channels extending inwardly in said end cap, said end cap including a plurality of downwardly projecting ribs, said contaminant channels extending between adjacent ones of said ribs,
   said end cap including a lower annular first ridge, said ribs extending radially out from said first ridge to define a plurality of lower surface portions having peripheral edges and disposed between each pair of adjacent ribs, said ribs extending out beyond said lower surface portions to provide offset between said peripheral edges and an inner surface of said peripheral wall,
   said annular threaded portion being distinct from said end cap and having said ribs at least partially resting thereon, all of said lower surface portions being co-planar and unbounded at their peripheral edges,
   said end cap having a lower annular second ridge, concentric and within said first ridge, and an annular isolation seal disposed between said first and second ridges and operable to mate with a cylindrical interior wall of a collection bowl.

2. An invention comprising a fuel filter unit including:
   (a) a casing having a cylindrical peripheral wall and first and second fuel ports to define a fuel flow path through said filter unit;
   (b) a first filter medium extending in a loop within said casing and separating a central fuel chamber from a peripheral fuel chamber, said peripheral fuel chamber disposed directly between said first filter medium and said casing, said first filter medium disposed intermediate said first and second fuel ports in said fuel flow path;
   (c) a peripheral contaminant outlet operable to allow contaminants to directly exit from said peripheral fuel chamber by way of at least one contaminant channel;
   (d) an end cap disposed below said first filter medium, said contaminant channel inwardly extending in said end cap; and
   (e) an annular threaded portion distinct from said cylindrical peripheral wall and disposed in line below said end cap and at said cylindrical peripheral wall and operable to threadingly engage mating threads on a cylindrical peripheral wall of a collection bowl such that the engagement between said threaded portion and the mating threads separates said peripheral fuel chamber from ambient air,
   said filter unit including a plurality of peripheral contaminant outlets allowing contaminants to directly exit from said peripheral fuel chamber by way of a corresponding plurality of contaminant channels extending inwardly in said end cap, said end cap including a plurality of downwardly projecting ribs, said contaminant channels extending between adjacent ones of said rubs,
   said end cap including a lower annular first ridge, said ribs extending radially out from said first ridge to define a plurality of lower surface portions having peripheral edges and disposed between each pair of adjacent ribs, said ribs extending out beyond said lower surface portions to provide offset between said peripheral edges and an inner surface of said peripheral wall,
   said end cap having a lower annular second ridge, concentric and within said first ridge, and an annular isolation seal disposed between said first and second ridges and operable to mate with a cylindrical interior wall of a collection bowl.

3. The invention of claim 2 further comprising a contaminant collection bowl removably attached to said filter unit, said collection bowl including:
   at least a first contaminant collection zone;
   a cylindrical outer wall extending around said first contaminant collection zone;
   an annular rim extending around the outside of said outer wall, said annular rim having an upper surface extending outwardly at an acute angle with respect to said outer wall;

threads extending around an outer upper portion of said outer wall and engaged to said threaded portion; and an annular seal seated in the acute angle between said rim and said outer wall and operable such that an increased pressure differential between said first contaminant collection zone and ambient air will increase the sealing force of said annular seal.

4. An invention comprising a fuel filter including:
(a) a casing having a cylindrical peripheral wall and first and second fuel ports to define a fuel flow path through said filter unit;
(b) a first filter medium extending in a loop within said casing and separating a central fuel chamber from a peripheral fuel chamber, said peripheral fuel chamber disposed directly between said first filter medium and said casing, said first filter medium disposed intermediate said first and second fuel ports in said fuel flow path;
(c) a plurality of peripheral contaminant outlets operable to allow contaminants to directly exit from said fuel chamber by way of a corresponding plurality of contaminant channels;
(d) an end cap disposed below said first filter medium, said end cap including a plurality of downwardly projecting ribs, said contaminant channels each inwardly extending in said end cap between adjacent ones of said ribs; and
(e) an annular threaded portion distinct from and disposed below said end cap and having said ribs at least partially resting thereon and operable to engage mating threads of a contaminant collection bowl, said ribs extending into contact with said cylindrical peripheral wall, said end cap including a lower annular first ridge, said ribs extending radially out from said first ridge to define a plurality of lower surface portions having peripheral edges disposed between each pair of adjacent ribs, said ribs extending out beyond said lower surface portions to provide offset between said peripheral edges and an inner surface of said peripheral wall, wherein all of said lower surface portions are co-planar and are unbounded at their peripheral edges, said end cap having a lower annular second ridge, concentric and within said first ridge, and an annular isolation seal disposed between said first and second ridges and operable to mate with a cylindrical interior wall of a collection bowl.

* * * * *